United States Patent
Al-Sabawi et al.

(10) Patent No.: US 9,975,786 B2
(45) Date of Patent: May 22, 2018

(54) WASTE POND VOLUME MANAGEMENT

(71) Applicant: ExxonMobil Research and Engineering Company, Annandale, NJ (US)

(72) Inventors: Mustafa Al-Sabawi, London (CA); Gordon Bryce McGarvey, Sarnia (CA); Robert James Falkiner, Brampton (CA); Robert N. McLean, Calgary (CA); Lawrence J. Evers, Sarnia (CA)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 190 days.

(21) Appl. No.: 15/163,038

(22) Filed: May 24, 2016

(65) Prior Publication Data
US 2016/0362306 A1    Dec. 15, 2016

Related U.S. Application Data (60) Provisional application No. 62/172,974, filed on Jun. 9, 2015.

(51) Int. Cl.
| | |
|---|---|
| *C02F 1/04* | (2006.01) |
| *C02F 1/10* | (2006.01) |
| *C02F 7/00* | (2006.01) |
| *B01D 3/34* | (2006.01) |

(Continued)

(52) U.S. Cl.
CPC .............. *C02F 1/048* (2013.01); *B01D 3/346* (2013.01); *C02F 1/04* (2013.01); *C02F 1/10* (2013.01); *C02F 7/00* (2013.01); *C02F 2103/007* (2013.01); *C02F 2103/10* (2013.01); *C02F 2209/38* (2013.01); *Y02W 10/15* (2015.05)

(58) Field of Classification Search
CPC .... C02F 1/04; C02F 1/048; C02F 1/10; C02F 7/00; B01D 3/346; Y02W 10/15
See application file for complete search history.

(56) References Cited

U.S. PATENT DOCUMENTS

| | | |
|---|---|---|
| 2013/0081298 A1 | 4/2013 | Bugg et al. |
| 2013/0112561 A1 | 5/2013 | Jajuee et al. |
| 2013/0175223 A1 | 7/2013 | Rennard |

FOREIGN PATENT DOCUMENTS

| | | |
|---|---|---|
| CA | 2776389 A1 | 11/2012 |

OTHER PUBLICATIONS

Raimundo, A.M. et al. (2014). International Journal of Thermal Sciences, 86, 28-40.*

(Continued)

*Primary Examiner* — Brian A McCaig
(74) *Attorney, Agent, or Firm* — Glenn T. Barrett (57) ABSTRACT

A method of improving the evaporation from surface bodies of water which comprises artificially inducing air flow over a body of water using air jets at an air flow rate of at least 10 m/second while the water partial pressure of air at the surface temperature of the body of water (Pbs) is greater than the water partial pressure of the ambient air at the surface temperature of the body of water (Pas). The rate of evaporation can be materially enhanced by the transfer of geothermal heat from the lower region of the body of water to the surface region by means of a heat exchanger or a heat pipe.

15 Claims, 2 Drawing Sheets

Relative Humidity Changes for Sarnia and London Ontario for April 14, 2003

(51) Int. Cl.
C02F 103/10 (2006.01)
C02F 103/00 (2006.01)

(56) References Cited

OTHER PUBLICATIONS

Katto, Y. et al. (1969). Bulletin JSME, 12, 79-86.*
El-Dessouky et al., "Evaporation Rates from Fresh and Saline Water in Moving Air", Ind. Eng. Chem. Res., 2002, pp. 642-650, vol. 41, No. 3, American Chemical Society.
Smith et al., "Rates of Evaporation from Swimming Pools in Active Use", ASHRAE Transactions: Research, 1998, pp. 514-523, vol. 104, iss. 1.
Smith et al., "Measurement and Analysis of Evaporation from an Inactive Outdoor Swimming Pool", Solar Energy, 1994, pp. 3-7, vol. 53, iss. 1, Pergamon, Elsevier Science Ltd.

* cited by examiner

Figure 1: Relative Humidity Changes for Sarnia and London Ontario for April 14, 2003

Figure 2: Evaporation rate of MFT under various conditions

Figure 3: Evaporation Rate of Brine Under Static and Flowing Conditions

WASTE POND VOLUME MANAGEMENT

CROSS-REFERENCE TO RELATED APPLICATIONS

This application claims priority to U.S. Provisional Application Ser. No. 62/172,974 filed on Jun. 9, 2015, herein incorporated by reference in its entirety.

FIELD OF THE INVENTION

The present invention relates to the management of the volume of waste ponds.

BACKGROUND OF THE INVENTION

Management of the volume of tailings, aqueous solutions, emulsions or suspensions of nonvolatile salts ("brines"), organics or solids are relevant to many industrial sectors. Applications with salts such as sodium chloride, calcium chloride, sodium carbonate, potassium carbonate (potash), mixed salts (saltcake), etc. include, but are not limited to, underground hydrocarbon storage in salt cavems, production of table or industrial salt, solution salt mining or disposal of run-off, process or reject streams from desalination plants, mining, petroleum production/refining, or other processes. Applications with aqueous organics such as non-volatile alcohols, glycols, amines, acids/sulfonates, organic salts include, but are not limited to, ice/hydrate control, drying/humidity control, heating, ventilation and air conditioning (HVAC), Biox solids or organic salt production. Applications with tailings, comprised of sand, clays, salts, metals, radioactive materials, hydrocarbons include, but are not limited to, mineral mining, bitumen/heavy oil production, or heap leaching. In each case, there is an incentive to remove all or a portion of the water from the aqueous phase in the most economical manner possible.

In the case of tailings ponds generated from oil sand activities, the goal is to dewater the tailings to turn the ponds into a trafficable landscape that is solid enough to allow for motorized traffic and eventually, land reclamation. Currently in Northern Alberta tailing ponds cover about 180 km². While some of the water is released and recycled from the ponds to be reused in oil sand processing, the majority remains as mud almost indefinitely. Due to the nature of tailing ponds, there are serious challenges faced by the oil sand industry, from both environmental and economic perspectives. Currently, there are no commercial tailings management technologies that are allowing for efficient and timely reclamation of the tailings ponds back to boreal forest or equivalent land capability.

The rain dilution of brine ponds in cool humid climates such as Sarnia, Ontario has been a problem seeking a solution for more than 20 years. The balance between passive evaporation and rainfall can be approximated by the "pan evaporation rate" and precipitation as measured and reported in US, Canadian and other government meteorological data. There are many government, industry and academic charts and graphs available that clearly indicate that cool humid climates are not suitable for brine pond evaporation Different types of ponds present various challenges in the management of their volumes.

Tailings Ponds

The tailings generated from the bitumen extraction process are typically stored in above-ground settling basins ('ponds'). When tailings are released to a pond, large solid particles (mainly sand) settle to the bottom while water rises to the top. During this process, a middle 'mature fine tailings' (MFT) or 'middlings' layer, composed of water-suspended fine clay particles, is created. The challenge is that MFT/middlings take years to settle, which hinders water extraction from the ponds and subsequent drying of tailings and consequently, results in extensive delays to land reclamation. Following several decades of MFT settling, the dried land can eventually, e.g. in 30 years, be covered by sand and topsoil to enable a reclaimable area containing both upland and wetland features.

Oil sands tailings ponds are constructed with containment dykes and groundwater monitoring facilities in order to capture and recycle run off water and minimize seepage. Currently, a portion of the 'free' water from the tailings ponds is recovered and reused in the bitumen extraction process, while the remainder is left in the ponds to allow the mature fine tailings to settle over time. In order to protect the quality of river water, it may be necessary to ensure that no water that has been used in the bitumen extraction process is returned to rivers. Instead, the used water may need to be transferred to tailings ponds and then recycled into the production process.

Brine Ponds

Sub-saturated brine will dissolve salt from the walls of storage caverns and hence alter the shape and integrity of the storage facility in an uncontrolled manner. Several caverns in the Sarnia area of Ontario, Canada, for example, have been adversely affected by "solution salt mining" due to sub-saturated brine over decades of use. Sub-saturated brine occupies additional surface storage volume, and when surface storage is full, it must be stored in the cavern, reducing the cavern volume available for hydrocarbon storage.

The cost of brine disposal continues to increase, and is currently at about US $3/bbl with "take or pay" minimums. In cool/humid climates, the volume requiring disposal may be increased by a typical factor of four or five as a result of rain/snowfall dilution. In addition, current brine disposal outlets are subject to third party acceptance terms and processes and potential regulatory constraints, and are not considered to be secure long term.

In some instances, it is feasible to use overhead roofs or floating covers to isolate the brine storage facility from atmospheric precipitation and absorption at high humidity. The practicality of using covers or roofs is limited by the size (surface area cost), shape (regular versus irregular), location and number of ponds. Pond surface covers still require a system to collect water from the top of the cover, and dispose of the water in accordance with increasingly stringent environmental regulations. The recovered water may still be contaminated enough to require subsequent treatment prior to disposal and may still require disposal as brine even if only slightly contaminated with brine. Floating pond covers carry a high risk of damage during use or transport into adjacent areas during wind storms, hurricanes or tornadoes. As a result, pond covers are not commonly used, and it is generally more economical to dispose of rainwater diluted brine into industrial or potable salt production. This generally involves a fee for processing in addition to the operating and transportation costs, all borne by the producer/seller of the excess brine. These outlets are not considered to be secure, and are subject to re-negotiation every few years.

In some instances, excess brine volumes are managed by injection into porous underground aquifers that are deep and salty. This method depends on aquifer availability, and the proper approvals being in place to permit injection. In other cases, underground disposal wells are employed, but this also requires an available well, and a permit to inject. The high cost of drilling coupled with high probabilities of accessing a formation with poor disposal characteristics may render this option unavailable in practical economic terms and the substantial distance to the next closest suitable disposal formation could require a pipeline or an increase in trucking cost, making this unattractive.

Brine flash evaporators have been employed but are expensive to operate and are susceptible to fouling and corrosion. Membrane technologies are technically feasible, but suffer from high capital and operating costs (high pressures for reverse osmosis, and the cost of equipment installation for direct osmosis). Other methods to manage local brine volumes include transfer to another surface location and shipment for ocean disposal are not normally feasible for inland areas but resort may be made to this option if containment becomes sufficiently critical to justify the high cost.

Various studies and proposals on evaporation have been made. El-Dessouky, H. T. et al, "Evaporation Rates from Fresh and Saline Water in Moving Air", *Industrial and Engineering Chemistry Research*, 41, 642 (2002), for instance, reports the results of studies on the named topic. Smith et al. have reported two series of studies in C. C. Smith et al., "*Measurement and Analysis of Evaporation From an Inactive Outdoor Swimming Pool*", Solar Energy, 53, 3 (1994 and C. C. Smith et al., "*Rates of Evaporation from Swimming Pools in Active Use*", ASHME Transactions: Research, 104(1), 514 (1998).

US 2013/0175223 (Rennard et al) discloses a method of remediating slurry ponds by distributing geotextile or geotubes over the surface of the pond and placing a sand load on these materials to allow supernatant water to flow to the top and separate out of the sludge layer.

US 2013/081298 (Bugg et al.) discloses a method to improve the dewatering and drying of mature fine tailings in oil sands by the addition of flocculants: the flocculated fine tailings are deposited on a deposition cell with a sloped bottom surface to allow drainage of released water.

US 2013/112561 (Jajuee et al.) describe the design and use of electrokinetic thickeners having a voltage gradient to dewater slurries, including tailings.

CA 2776389 (Betzer et al.) describes a method of utilizing heat to generate steam (i.e. separating water) from a mixture of water, solids and organics. The described method entails using a hot driving fluid to heat water containing solids and organics to separate solids and produce steam that can be used for underground injection or for generating hot process water but does not address the dewatering/drying of tailings.

SUMMARY OF THE INVENTION

The present invention is a method based on the fact that water is preferentially evaporated from tailings ponds, brine ponds or any other bodies of water during periods of reduced humidity, concentrating the remaining non-volatile soluble materials in solution, and concentrating any precipitated or suspended solids in the remaining liquid. This method is based on the use of a large volume, high velocity air jet moving horizontally across the surface of a brine pond or, more generally, a waste pond in order to enhance the rate of evaporation during times of day or year when ambient conditions are suitable for evaporation.

The present invention provides a method of improving the evaporation from surface bodies of water which comprises artificially inducing air flow over a body of water using air jets at an air flow rate of at least 10 m/second (36 kph) while the water partial pressure of air at the surface temperature of the body of water (Pbs) is greater than the water partial pressure of the ambient air at the surface temperature of the body of water (Pas).

The use of air jets to promote and/or control the evaporation of waste/brine ponds is uniquely favorable from the point of effectiveness in evaporation coupled with a low energy requirement. The air jets are advantageous for evaporation of water from large areas (ponds) as a result of enhanced surface contacting and additional air entrainment as the air jet dissipates into turbulent flow. It is more energy efficient to sustain low pressure high velocity air jets than it is to heat tailings or brine for boiling, to compress air for sparging, or to pump high density brine for spraying or membrane separations. Pond drying using air jets eliminates the requirement for brine or water to be physically transported from the ponds for offsite processing or disposal and does not require brine or water to be removed from the pond storage area for offsite processing or disposal. Furthermore, the use of air jets eliminates the need for an external heat source for the heat of vaporization of the evaporated water and avoids having hot or corrosive brine come into contact with any metal process equipment. In combination, these considerations result in a significant capital and operating cost advantages versus heated evaporators, membrane separations and other alternatives such as pond covers.

The present method does not require external heating to provide the necessary heat of vaporization of water from brine, as is required for flash evaporators, or of water from tailings, resulting in significantly lower operating cost. The evaporation rate may be enhanced further by the use of low grade geothermal ("earth energy") heat or low grade waste heat transferred to the surface region of the body of water by means of geothermal heat from the lower region of the body of water. The transfer is preferably affected using heat exchangers devised for this purpose which, in the case of brine ponds, function without contact of hot corrosive brine with any metal processing equipment so that the previously encountered corrosion problems with heated brine are significantly alleviated. The only passive components in contact with brine are plastic, with anticipated lifetimes of at least 20 years.

The present method does not require high capital cost per unit volume of water evaporated as is the case for flash evaporators or membrane separations. It consumes less energy than processes that either heat the brine or tailings for drying/boiling, compress air for sparging or pump brine for spraying or membrane separation. This method has potential for use by similar pond operators in other industries, including the mining industry.

For the applications described here, and other similar applications, the use of low-pressure, high-velocity air movement across the water surface will be sufficient to effect the desired evaporation and hence overall volume reduction of retained water under the appropriate temperature and humidity conditions. In isolated bodies of water (or other fluid) with a temperature gradient with depth (colder at surface), heat pipes can be employed to transfer heat to the surface from deeper regions of the fluid body. Finally, in certain circumstances, it would be most beneficial to couple the use of surface heating by the use of heat pipes with the use of high-velocity, low-pressure air movement to take advantage of the low water content of air during periods such as winter months when the air is dry, but the water temperature is cold.

Using the present induced air evaporation method, excess tailings and brine pond volumes from rainfall/snowfall dilution can be managed economically even in cold and humid climates that are generally considered to be unsuitable for pond evaporation. High velocity air jets are used in combination with daily and seasonal variations in climatic conditions control of surface salinity by transfer of rain diluted (higher vapor pressure) surface brine or tailings from the top of other ponds, and use of available heat. Under optimum conditions, the evaporation rate is high enough to cause significant evaporative cooling of the tailings or brine. Optionally, any available source of heat and especially low grade geothermal ("earth energy") heat or low grade waste heat can be used with a heat exchanger design to heat the tailings or brine pond surface preferentially to increase the evaporation rate further. While warm tailings or brine and warm dry air tend to be preferred, there are always tradeoffs with combinations of the size/number of air jets used, surface area/hours blown, surface salinity and heat used.

DETAILED DESCRIPTION

For the purpose of practicing the method, it is important to know the brine strength and temperature at the surface to know the humidity/vapor pressure of water at the brine surface ($P_{bs}$, the water partial pressure of brine at surface temperature) and the absolute humidity/vapor pressure of the ambient air when heated or cooled to brine surface temperature ($P_{as}$, water partial pressure of air at brine surface temperature). If $P_{bs} > P_{as}$, then water will evaporate from brine into the air and the fans should be put on. The greater the difference between $P_{bs}$ and $P_{as}$, the greater the evaporation rate at constant air flow conditions. However, if $P_{bs} < P_{as}$, then water will be absorbed from air into brine, and the fans should be left off. It is initially counter intuitive that the actual temperature or relative humidity of the ambient air are not primary factors in the evaporation rate: these are only factors in how much the brine/waste pond cools down over time, eventually reaching a dynamic equilibrium between $P_{bs}$ and $P_{as}$ at a constant temperature. When the humidity of the brine surface ($P_{bs}$) is higher than the humidity of ambient air at brine surface temperature ($P_{as}$), water will evaporate from the brine into the air, and air flow should be maximized to enhance evaporation. This generally happens during daylight hours after the air mass has been heated, and the relative humidity drops during the day although it can occur at other times, including at night. When the humidity of the brine surface is lower than the humidity of the ambient air at brine surface temperature, there will be a transfer of water from the air into the brine, and air flow should be minimized to reduce absorption. This generally happens at night, when the air mass cools, and relative humidity rises, or during periods of high daytime humidity, fog or rainfall (>74% relative humidity at pond surface temperature).

Additionally surface rainfall accumulation is of lower density than the more saturated brine, tending to layer on the top. This lower density water has a higher vapor pressure than the more saturated brine at the same temperature. As a result, it is doubly advantageous to evaporate only the least concentrated brine at the surface than to treat brine from deeper in the pond (pump suction lines are generally near the bottom of the pond, which is probably the worst case).

The relative humidity in a given location changes following both diurnal cycles and annual cycles, in addition to instantaneous local conditions. Whereas solar evaporation of water from brine is a proven methodology in locations such as Utah, Nevada and California with extended periods of low relative humidity the method may be of little or no use elsewhere, e.g. on the humid East Coast of the USA. Generally, the ratio of evaporation rate to precipitation rate should exceed 3:1 for a viable commercial operation.

In the case of producing table salt or an industrial salt the objective is complete removal of the water to precipitate a dry salt product. Typically, large area shallow ponds are used to maximize the solar heating which provides the majority of the heat of vaporization of water. Evaporation ponds of this type are commonly called Solar Evaporation Ponds for this reason, and are commonly used in hot, arid climates. In the case of underground hydrocarbon storage, the objective is to maintain brine concentration near the saturation limit without precipitating salt that can foul pumps and transfer lines. The brine is used as a displacement fluid for hydrocarbons such as ethylene, ethane, propane or butanes that are stored in large underground salt caverns. For example, in a typical subject case a total capacity in excess of 2 million cubic meters (about 12 million barrels) in about 40 caverns requires the same volume of saturated brine to be stored on the surface in order to use the full capacity of the caverns on a seasonal basis. The brine is often stored in uncovered surface ponds exposed to the prevailing climatic conditions. Unlike solar evaporation ponds, they are usually as small (and deep) as practical, to minimize the amount of land area used, and the area for collection of rainfall. Under this storage scenario, brine volumes will increase, and brine concentrations will decrease when the local annual precipitation exceeds the local annual evaporative losses. The use of concentrated brine for a displacement fluid reduces the extent of undesirable solution mining of the cavern walls and hence is beneficial for retention of cavern structural integrity over a long period of time. Sub-saturated brine occupies additional surface storage volume, and when surface storage is full, it must be stored in the cavern, reducing the cavern volume that is available for hydrocarbon storage. As a result rainfall dilution of brine adversely affects salt cavern seasonal storage capacity, long term salt cavern viability and ongoing operating cost for excess brine volume disposal cost.

The amount of brine dilution and subsequent disposal cost is dependent upon the local climate, since the net volume growth is the difference between the gross water intake from all sources and the average annual evaporation rate under ambient (uncontrolled) conditions. The water sources will include rainfall, snowfall, blowing snow and absorption of water from high humidity air into concentrated brine. The latter is similar to dew formation at night, and for saturated sodium chloride will occur when the relative humidity of ambient air at pond surface temperature exceeds about 74% relative humidity.

Air Jets

Air jets may conveniently be described as a localized flow of a body of air induced to flow through a region of ambient air (which itself may be subject to normal atmospheric conditions and disturbances) at a speed above that of the air surrounding the flowing body. According to the invention, air jets are preferred over ordinary forced air convection for several reasons:

1. An air jet over a flat surface creates a local Bernoulli pressure drop at the surface under the jet, causing the jet to more tightly adhere to the surface. This has the effect of increasing turbulence and contact thereby enhancing heat and mass transfer and evaporation rate. Under ideal conditions, all of the air blown will contact and come into equilibrium saturation with the pond surface.
2. An air jet will entrain additional air as the jet slows down and dissipates into turbulent flow, essentially augmenting the amount of air flowing over the pond, ranging from about 3× for a low speed air jet in free air, to as much as 20 with a high speed air jet and an optimized convergent/divergent eductor to draw or entrain ambient air into the jet. It is anticipated that the entrainment rate will be in the 4-6 v/v range for air jets in the 80-110 kph (about 50-70 mph) range, equivalent to air flow rates of about 20-30 m/second. The maximum useable jet velocity is anticipated to be limited by surface brine entrainment and carryover out of the pond dike area which is not acceptable. The velocity/flow rate of the jet relative to the surrounding air will of course, vary across the body as a result of frictional effects between the moving jet and the ambient air with the production of vortices at the interface. The flow rate relative to the surrounding ambient air may be taken as the flow rate across the central core of the jet, extending over about 80 percent of the transverse cross-section of the jet.
3. An air jet extends the "reach" of the air across the pond and minimizes the "stagnation effect" observed at low air speeds on large ponds. Slow steady breezes tend to become laminar near the pond surface, resulting in the layer in contact with the surface to become saturated prior to traversing the pond. No further evaporation occurs after the stagnation point when the air in contact with the brine/tailings surface has become saturated.
4. Air Jets can be optimized in both number and arrangement to suit different pond dimensions and configurations. Examples could be inline abreast, radial inward (potential benefit from upward vortex flow), radial outward, center line outward etc. Fans can be ducted, for example with several nozzles from a central duct or have one nozzle per fan, or several fans per nozzle (to increase jet velocity). Fans can be run in series to increase static pressure and nozzle velocity with a smaller nozzle, or in parallel to increase flow rate and nozzle velocity in the same size nozzle. Generally, more effective evaporation will be achieved with a greater number of jets passing over the pond while allowing regions of ambient air between the jets to permit entrainment into the jets to enhance evaporation further.
5. Air Jets can be created with many different devices including fans, turbo blowers etc., with different duct and nozzle configurations depending upon the application. Fans may range in size from low cost fractional hp 70 m$^3$/min (about 2500 CFM) "carpet drying" fans (or smaller) to 18 kw/25 hp 30,000 CFM (about 850 m$^3$/min) vane-axial fans as used in 75 kw/100 hp 100,000+ CFM (about 28,000+m$^3$/min) fans, turbo blowers, to extremes of 25,000 shaft hp (or larger) aeroderivative high bypass ratio turbofans, similar to those used on large commercial jet aircraft.
6. Air Jets can be created with high velocity at low pressure drop and power consumption, and can be scaled up to the large volumes needed for large scale evaporation economically. Compressing large volumes of air to even moderate pressures consumes large quantities of energy. For example, compressing about 850 m$^3$/min (30,000 CFM) at 5 cm (2 inches) static pressure and 6000 feet per minute (about 1830 m/min) consumes about 15 kw/20 hp, so can be scaled up easily to hundreds of thousands or even millions of standard cubic feet per minute air flow rate economically. Compressing the same 30,000 CFM (850 m$^3$/min) volume to only 2 psi (13 kPa) to sparge the pond at the 4 foot level would take over 250 horsepower (185 kw), and be uneconomic to scale up to the required volume for large scale evaporation.
7. Air Jets can be added modularly to increase the surface area being blown to achieve the required evaporation for each situation. Optionally, the air can be heated or de-humidified to enhance evaporation rate, or sources of available warm or low humidity air that may be available may be used preferentially over ambient air. Examples might be air obtained from an above ground 'stack' rather than air from ground level that may be more humid from soil evaporation, or from upwind water sources, or conditioned air from a process, building or underground mine, such as ventilation exhaust air that is warmer or drier than ambient air.

Waste or Geothermal "Earth Energy" Heat

Waste or Geothermal Heat can be utilized in a number of different ways. Metal heat exchangers for either flash evaporators or waste heat are prone to salt fouling and corrosion. A novel heat exchanger has been devised which eliminates these problems, and supplies heat at the point of water evaporation at the surface of the pond, where the heat is most effective for supplying the necessary heat of vaporization.

The heat exchanger comprises a pipe loop, preferably of ordinary black plastic water pipe (generally a pliable polyethylene filled with carbon black for UV protection). A combination of relatively thin wall thickness and the carbon black filling provides a reasonable and effective heat transfer from the working fluid inside the pipe to and from the pond. One section is weighted to maintain the pipes near the lower region of the pond, while the other which is sufficiently buoyant to remain in the lower density brine of the surface region; floats may be provided if necessary to maintain the desired degree of buoyancy. The working fluid can be any non-freezing mixture, and, in the case of brine ponds, could be diluted brine taken from near the pond surface to avoid salt precipitation and fouling with temperature changes. The working fluid is pumped first towards the lower section at the warmer pond bottom, where it picks up low grade geothermal heat and then to the top section, where the heat is exchanged with the colder surface. This process is enhanced by large surface evaporation rates that cause evaporative cooling of the surface, and with deep ponds that provide a continuous source of heat throughout the year, including during winter in cool and cold climates. Alternately, the plastic heat exchanger tubes can be sealed and partially filled with a vaporizing refrigerant with properties similar to butane (normal boiling point 0° C.) to form a passive "heat pipe". This can be either a closed loop with the ends joined together, or a single linear length sealed at both ends. In either case, the lower portion, about half the length, is maintained at pond bottom with half buoyed up to the surface. Under these conditions, the liquid refrigerant flows by gravity to the lower section at the pond bottom, where it is heated to pond bottom temperature and pressure, causing it to boil and produce warm vapor in the process. The vapor flows upward toward the surface, where it is cooled and condensed back to liquid, completing the cycle. The vaporization at pond bottom and condensation at pond surface causes a net heat transfer of heat from bottom to top of pond. No external source of energy is required to maintain the liquid/vapor flows, and it continues to operate so long as there is a temperature difference between the bottom and top of the pond. The low capital and operating cost of this process makes it particularly attractive to brine/waste pond evaporation.

The size and number of heat transfer tubes can be increased modularly in combination with the size/number of fans and surface area blown to achieve the evaporation rate necessary for any given circumstance.

Daily, Monthly and Yearly Temperature/Humidity Cycles

If the ponds are sufficiently deep, earth energy heat at greater than about 15° C. (60° F.) is available in combination with solar heating during the winter throughout most of the cool and cold northern and southern latitudes. The combination of using low grade geothermal "earth energy" heating makes year round winter operation feasible, even when the ambient air is below the freezing point of water or tailings or brine (i.e., the air becomes heated by the brine rather than the brine being heated by the air). Evaporation occurs in either case when Pas>Pbs. The combination of using earth energy with air blowing is more effective than either alone. This is shown by the data in Tables 1, 2 and 3 below, taken from one brine pond in Sarnia, Ontario from April 1998, and monthly temperature percentiles from the Canadian General Standards Board (CGSB) 30 year data base, and hourly database for the area. This data illustrates several points which are relevant to the practice of the method.

TABLE 1

Temperature and Salinity Change with Depth in Brine Pit

| Depth (m) | Temperature (° C.) | Salinity (wt. pct). |
|---|---|---|
| Surface | 17.5 | 15 |
| 1.8 | 23 | 18.5 |
| 3.6 | 27 | 22.2 |

TABLE 2

CSGB Monthly Temperature Percentiles

| | T1% | T2.5% | T5% | T10% | T50% | T90% | T95% | T97.5% | T99% |
|---|---|---|---|---|---|---|---|---|---|
| Dry Bulb | −6.6 | −4.7 | −3.1 | −1.6 | 7 | 2115.5 | 18.1 | 20.6 | 23.4 |
| Wet bulb | −7.3 | −5.5 | −4.0 | −2.6 | 5.0 | 12.0 | 14.2 | 16.0 | 17.5 |

TABLE 3

Vapor Pressure of Aqueous Brine (mm Hg)[1]

| Temp. | Percent NaCl in Brine | | | | | |
|---|---|---|---|---|---|---|
| (° C.) | 0.0 | 5 | 10 | 15 | 20 | 25 |
| 0 | 4.58 | 4.4 | 4.3 | 4.1 | 3.8 | 3.5 |
| 10 | 9.21 | 8.9 | 8.6 | 8.2 | 7.7 | 7.1 |
| 20 | 17.54 | 17.0 | 16.4 | 15.7 | 14.8 | 13.6 |
| 30 | 31.83 | 30.9 | 29.8 | 28.5 | 26.8 | 24.7 |

TABLE 3-continued

Vapor Pressure of Aqueous Brine (mm Hg)[1]

| Temp. | Percent NaCl in Brine | | | | | |
|---|---|---|---|---|---|---|
| (° C.) | 0.0 | 5 | 10 | 15 | 20 | 25 |
| 40 | 55.34 | 53.6 | 51.7 | 49.5 | 46.6 | 43.0 |
| 50 | 92.54 | 89.7 | 86.4 | 82.8 | 78.1 | 72.2 |

[1]From *Sodium Chloride*, D. W. Kaufmann (Ed.), p. 621, Reinhold, 1960.

1. On average, April is a cool and humid time of year for this location, with only 2-3 degrees Celsius difference between the average wet and dry bulb temperature distribution. This would imply an average relative humidity of around 70% which is too high for brine evaporation, and consistent with the net dilution of all brine ponds in the area.
2. There is a substantial gradient of both temperature and salinity in the pond with depth. The 27° C. temperature measured at the 3.6 meter depth level is well above the 99th percentile temperature for the area. The previous 5 winter months are all colder than April, so ambient temperature could not have contributed to heating, but only to cooling. This indicates that there is substantial solar and earth energy heating even during the winter months. However, the heat occurs preferentially toward pond bottom, and is not available to contribute to evaporation at the surface.
3. While the average humidity is high, it follows a daily cycle that follows the ambient temperature throughout the day, tending to 100% relative humidity at night (absorption into the pond) down to 40-60% during the day (evaporation from the pond). The absolute humidity of the air mass does not change very much through the day, and the pond surface temperatures change very slowly over the season, so there are some occasions when the air is dry enough at night for evaporation to occur, just as there are occasions during the day when air is too humid for evaporation, regardless of the ambient temperatures it the time. However, on long term average, conditions favorable for evaporation tend to occur during daylight hours.
4. By comparing average annual rain/snowfall with average excess brine disposal, we can estimate that about 40% of the rainfall does evaporate under ambient conditions. This implies that increasing the net evaporation rate by only a factor of 2-3 times will achieve a balance.
5. The use of the available heat at 27° C. from pond bottom in combination with cool (and dry) April ambient at 5-25° C. would provide a very large driving force for evaporation, easily comparable to the best summertime ambient conditions.
6. The solar component of brine pond heating is "once through" in that once it is used for evaporation, it is not renewed. However, "earth energy" heat at 15-20° C.

(about 60-70° F.) is continuously renewed by heat conduction through the earth to the brine at the pond bottom, so is available year round. This would provide a very large driving force for evaporation, even during the coldest mid-winter conditions, if it is transported to the pond surface, where the heat is available for evaporation. If the pond bottom is not deep enough to capture earth energy, then purpose built trenches or vertical "wells" can be used for the same net effect.

Salinity Control in Brine Ponds

Air evaporation of dilute brine is inherently more efficient because of the higher vapor pressure of water, and because the critical humidity for evaporation is higher, allowing operation for more hours per day. In addition, the higher evaporation rate per unit area means that less area of the pond has to be air blown to achieve the necessary net evaporation rate, lowering both the capital and operating cost. As a result, when there are several ponds, it is preferred to transfer diluted brine from the top of adjacent ponds into a smaller number of ponds that are equipped for air blowing and/or heat transfer than to equip all ponds for evaporation. When there is only one pond, only a section of the pond need be equipped for air blowing and/or heat exchange. As the lower density surface brine evaporates and becomes more dense, then dilute brine from adjacent areas of the pond will gravity flow into the area being blown. No external energy source is required for this brine flow, as it will occur naturally by density driven gravity flow. Brine pump suction salt plugging often occurs, as saturated brine cools down slowly during winter. This is currently dissolved by pumping hot water into the suction line, which is detrimental in the long term as it becomes additional diluted brine that must be disposed of at a cost. Salt plugging can be avoided by transferring diluted brine from the pond top to the pond bottom during the fall as the temperature drops, maintaining the pond bottom salinity slightly above the precipitation point. This does not incur additional cost for excess brine disposal. During the summer, additional air blowing can be done until the entire pond contents are saturated, minimizing long term "salt mining" of the caverns.

Example 1

Tailings Drying

Preliminary laboratory tests involving the drying of mature fine tailings (MFT) were conducted to assess the effect of forced convection (FC) versus heating on the drying rate of MFT. To evaluate the effect of forced convection, a jet of bone dry air was blown over MFT samples and the jet or 'wind' speed was measured using an anemometer. To assess the effect of heating MFT samples were placed on a hot plate with a temperature controller. All tests were conducted in a fume hood, the sash of which was kept at a constant height to ensure constant fume hood draft across all tests. The humidity within the fume hood fluctuated over the duration of the test program ranged from 40-62%. The samples of MFT, generated from a bitumen (oil sand) extraction process, were all held in round tinplate containers (6.2 inch/158 mm diam, 0.6 inch/15 mm height).

Tests were completed at the following conditions:
1. Heated MFT (~48° C.) with no forced convection (fume hood draft maintained at 0.9-1.0 m/s)
2. Room temp MFT with no forced convection (fume hood draft maintained at 0.9-1.0 m/s)
3. Room temp MFT with forced convection (jet speed at 4.2-4.5 m/s)
4. Heated MFT (~42° C.) with forced convection (jet speed at 3.2-3.3 m/s)

Results

Figure 1:
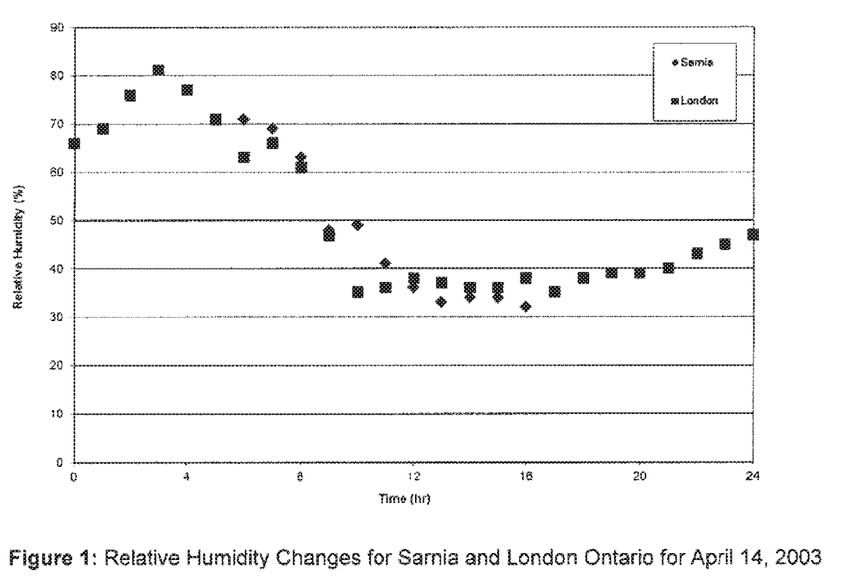
FIG. 1 is a graph illustrating the diurnal variation of humidity at Sarnia (Ontario, Canada) on a selected day (14 Apr. 2003).
Figure 2:
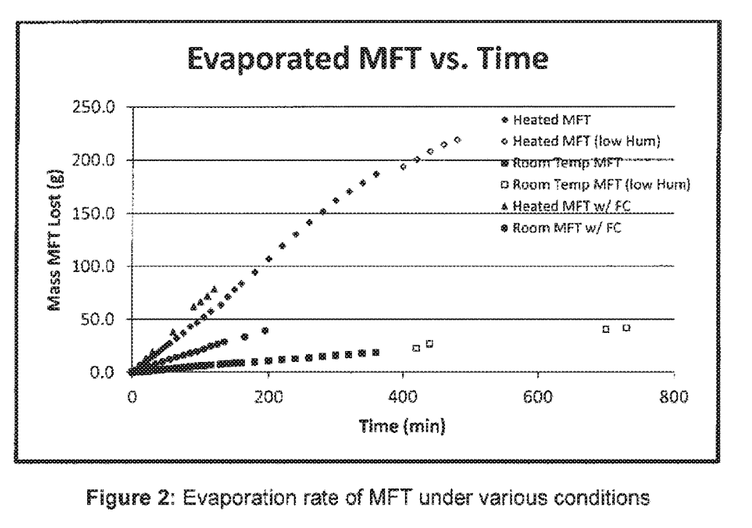
FIG. 2 is a graph illustrating the results of induced airflow evaporation experiments on mature fine tailings (MFT).

FIG. 2 presents the evaporation rates for each of the drying tests. It can be observed that heating the MFT to 48° C. led to an evaporation rate that is about 9.3 times higher than that of the MFT that was held at room temperature, for tests conducted in the absence of forced convection. Moreover, the MFT evaporated about 4.1 times faster when it was exposed to forced convection, for tests performed in the absence of heat. FIG. 2 also shows that the combined effect of forced convection and heating results in a water evaporation rate that is 1.3× faster than when only using heat to dry the MFT.

Example 2

Brine Evaporation

Figure 3:
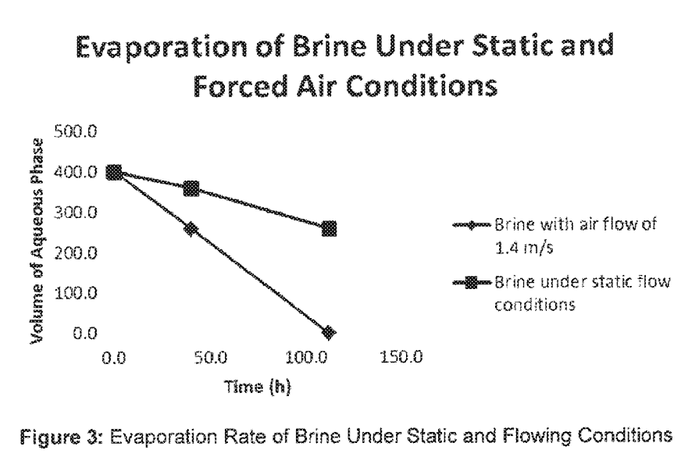
FIG. 3 is a graph illustrating the results of induced airflow evaporation experiments on brine under static and flowing air conditions.

The evaporation behavior of brine and pure water were compared under static conditions and under conditions with a moderate flow of air across the surface of the liquids (1.4 m/sec). In both cases, the rate of evaporation under flowing air conditions exceeded that of the static case by greater than three times. FIG. 3 shows the effect of static versus flowing air conditions and clearly shows the increase in evaporation rate with air flow. Under the relatively mild flow conditions considered in this example, the evaporation rate increase demonstrates the beneficial effect of increasing air flow across the surface of the brine, which would be an effective method to reduce water content and increase brine concentration.

What is claimed is:

1. A method of improving the evaporation from surface bodies of water which comprises artificially inducing air flow over a body of water using air jets at an air flow rate relative to the surrounding air of at least 10 m/second while the water partial pressure of air at the surface temperature of the body of water (Pbs) is greater than the water partial pressure of the ambient air at the surface temperature of the body of water (Pas).

2. A method according to claim 1 in which the air flow rate of the air jets relative to the surrounding air is at least 15 m/second.

3. A method according to claim 1 in which the air flow rate of the air jets relative to the surrounding air is at least 20 m/second.

4. A method according to claim 1 in which the air flow rate of the air jets relative to the surrounding air is from 20 to 30 m/second.

5. A method according to claim 1 in which the air jets are each passed through a convergent/divergent eductor to draw ambient air into the jet.

6. A method according to claim 5 in which the convergent/divergent eductor entrains 4 to 6 volumes of ambient air for each volume of air in the jet.

7. A method according to claim 1 in which the ambient humidity at the surface temperature of the body of water is less than 50%.

8. A method according to claim 1 in which the body of water comprises mature fine tailings.

9. A method according to claim 1 in which the body of water comprises a body of brine.

10. A method according to claim 1 in which a surface region of the body of water is heated by means of geothermal heat transferred from a lower region of the body of water.

11. A method according to claim 10 in which geothermal heat is transferred from the lower region of the body of water to the surface region by means of a heat exchanger comprising a pipe loop weighted in one section to hold it in the lower region of the body of water and containing a non-freezing liquid heat transfer medium.

12. A method according to claim 11 in which geothermal heat is transferred from the lower region of the body of water to the surface region by means of a heat exchanger comprising a pipe loop weighted in one section to hold it in the lower region of the body of water, a buoyant section to hold the buoyant section at the surface region of the body of water and containing a non-freezing liquid heat transfer medium.

13. A method according to claim 12 in which the pipe loop includes a pump to circulate the heat transfer medium around the loop.

14. A method according to claim 10 in which geothermal heat is transferred from the lower region of the body of water to the surface region by means of a heat pipe containing a refrigerant fluid which is vaporous at the temperature of the lower region of the body of water and liquid at the temperature of the upper region of the body of water.

15. A method according to claim 14 in which the refrigerant fluid comprises n-butane.

\* \* \* \* \*